Oct. 22, 1963    A. B. GOBBY    3,107,420
BEARING PULLER FOR UNIVERSAL JOINTS
Filed April 24, 1961
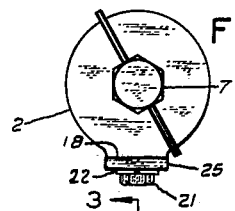
FIG. 2
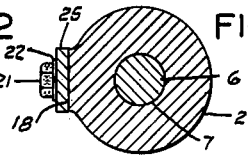
FIG. 4
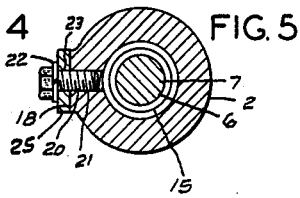
FIG. 5
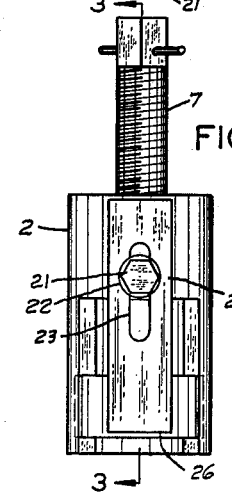
FIG. 1
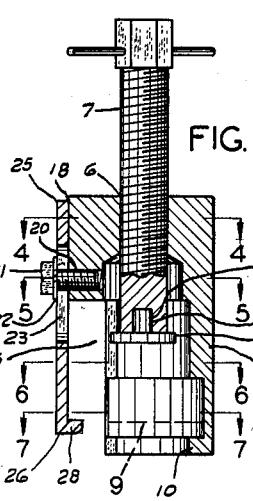
FIG. 3
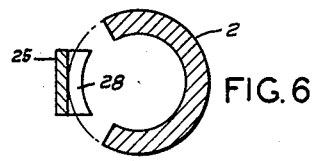
FIG. 6
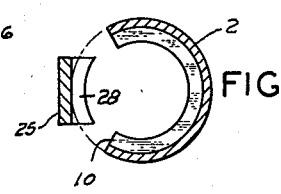
FIG. 7
FIG. 8

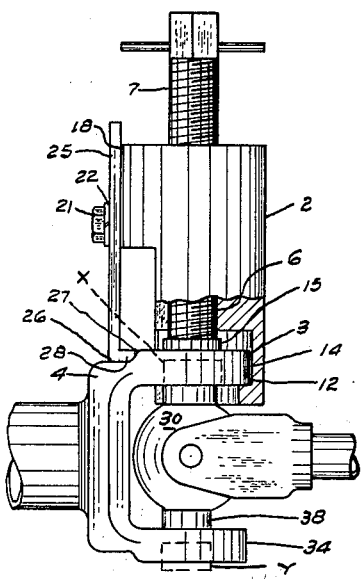
FIG. 10
INVENTOR.
Alan B. Gobby
BY Scott L. Norviel
atty.

United States Patent Office 3,107,420
Patented Oct. 22, 1963

3,107,420
BEARING PULLER FOR UNIVERSAL JOINTS
Alan B. Gobby, Glendale, Ariz.
(3444 W. Palmaire, Phoenix 21, Ariz.)
Filed Apr. 24, 1961, Ser. No. 105,072
3 Claims. (Cl. 29—263)

This invention concerns a universal puller adapted particularly for pulling needle bearings from the clevis housings of universal joints.

One of the objects of the invention is to provide a puller which will separate the needle bearing housings from clevis joints used in automobile drive shafts and the like; said puller being adapted to remove the bearings from various sizes of clevis joints and being constructed to seize and grip the clevis joint while pressure is applied to the bearing housing.

Another object of the invention is to provide a universal puller which has a body adapted to attach to and hold the clevis portion of a universal joint and move the bearing from its position within the joint with an even smooth pressure so as not to deform the bearings or the parts thereof.

Still another object is to provide a universal puller, adapted to remove the needle bearings from universal joints which has an attachment to prevent the housing from slipping from the clevis portion of the universal joint when pressure is applied by screw means to the bearing or to portions thereof.

Other objects will appear hereinafter.

I attain the foregoing objects by means of the devices, parts and combinations of parts shown in the accompanying drawings in which—

FIGURE 1 is a front elevational view of a puller incorporating and embodying my improvements;

FIGURE 2 is a plan view thereof;

FIGURE 3 is a mid vertical section of the puller taken substantially on lines 3—3 of FIGURE 1;

FIGURE 4 is a horizontal section taken through the body of the puller substantially on lines 4—4 of FIGURE 1;

FIGURE 5 is a horizontal section taken on lines 5—5 of FIGURE 3;

FIGURE 6 is a horizontal section taken through the body of the puller on lines 6—6 of FIGURE 3;

FIGURE 7 is a similar horizontal section taken on lines 7—7 of FIGURE 3;

FIGURE 8 is a plan view of a holding ring used in connection with the puller;

FIGURE 10 is a view of the puller when applied to universal joint to remove a bearing housing therefrom.

Similar numerals refer to similar parts in the several views.

Figure 9:
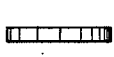
FIGURE 9 is an edge view thereof.

The body 2 is generally cylindrical in shape but has a cavity centrally formed that will admit and hold the forward portion 3 of a universal joint clevis 4.

At the top of this cavity, which is marked 5, there is a tapped bore 6 into which the pressure screw 7 is threaded.

At the bottom of the cavity there is a semi-annular lip 10 which is sized and disposed to engage the edge 12 of the outer curved portion of clevis 4. The lip fits under the curved outer portion while the rounded back portion 14 of the cavity (FIGURE 10) conforms closely to the rounded contour of the upper part of the clevis.

At the lower end of screw 7 there is a pressure disk plate 15. This is held in place by a centrally disposed positioning pin 16 which fits into a hole 17 centrally bored in the bottom end of screw 7. The pin 16 has a running fit in the hole 17.

On a flattened portion of the annular surface 18, near the top of the body 2, there is a radial hole 20 tapped to receive a cap screw 21. A washer 22 is placed under the head of the cap screw and bears on each side of a slot 23 formed in a rectangular flat holding plate 25. The slot allows the plate 25 to be adjusted vertically and while held in position by the cap screw 21. The lower end portion 26 of the plate is disposed so that it will bear on the raised portion 27 of the clevis 4 and when the cap screw is tightened the plate 25 will be held firmly against the body 2 and the lower end 26 will be held against the raised portion 27 of the body of the clevis 4. The lower end 26 has a projection 28 shaped and curved to conform to the raised portion 27 of the clevis. This structure will prevent the lip 12 from slipping off the lower edge of the rounded portion 14 of the clevis.

With the body of the puller in place on a universal joint clevis as shown in FIGURE 10, the screw 7 may be advanced downwardly so that the pressure plate 15 will bear on the end of the annular needle bearing race which forms a housing for the needle bearing X within the clevis portion of the universal joint.

As the screw 7 is advanced and pressure increases on the needle bearing casing or race, the bearing is forced out of the hole into which it is set in the clevis and then forces the universal joint ball 34 downward, so that the lower positioning ring 31 forces lower needle bearing Y downward and outward from the lower arm 34 of the clevis body 4, as shown in FIGURE 10. A gripping tool may then grasp the protruding end of the shell of bearing Y and complete its removal.

It is to be understood that needle bearings of this type are held by compression and are fitted very tightly into the holes provided for them in the clevis. After some use the grease with which the needle bearings are treated becomes hardened or they may become deformed and it becomes extremely difficult to remove them from the clevis 4. Previously, mechanics have resorted to pounding these bearings out with a hammer and some sort of a drift pin. This practice usually destroys the needle bearing housing and often deforms the clevis also. In addition to this, the practice is slow and time consuming and altogether inefficient.

By the use of the puller herein described, it may be easily hooked onto the outer rounded portion of the clevis of a universal joint, as shown in FIGURE 10, and the pressure plate then set in place by the use of the cap screw 21 to insure that the body 2 does not slip off of the end of the clevis and then the bearing housing may be forced out of the clevis using the screw 7, as above explained. This pressure is applied smoothly and easily and does not deform the bearing housing.

It is to be noted that the pressure plate 15 is easily replaceable on the bottom of screw 7 and therefore a pressure plate of the size desired to apply even pressure to the edge of the bearing may be selected.

It is also to be noted that the annular lip 12 may be made of such a size that it will accommodate and hold on the rims of various sizes of clevices. That is, the radius of the lip 10 does not have to be congruent with the radius of the curve of the outer end of the clevis. The lip 10 will hold even though there is not 100% contact around its portion of the annulus of the lip. It is for this reason and because also of the fact that the plate 15 is replaceable that I use the term "universal puller" in connection with this device.

With bearing Y removed the ball 30 may be removed from bearing X and this bearing then removed from the clevis. The protruding lower portion of bearing X may be removed with a gripping tool in a similar manner as was done with bearing Y.

The tool may also be used for forcing new bearings into the clevis by slightly altering the above procedure, as will be understood by those familiar with the art.

I claim:

1. A universal joint bearing puller consisting of a cylindrical body having a cavity to receive the outer curved portion of one arm of a U-shaped clevis, an axially disposed tapped bore joining the top of said cavity, a substantially semi-circular curved lip at the bottom of said cavity to engage under the edge of the outer curved portion of said clevis arm on substantially three sides, a pressure screw having a flat lower end threaded into said tapped bore, said body having a laterally disposed flat surface to bed a holding plate and readily extending threaded bore to receive a cap screw, a holding plate having a longitudinal centrally disposed slot and a lower end conforming to the inner portion of the clevis to retain the puller body in position on the clevis, and a cap screw having a head engaging the sides of said slot in said holding plate and a shank portion extending through said slot and threaded into the radial hole in said puller body.

2. A puller for use on a universal joint clevis having a U-shaped body with each arm of the clevis provided with a bearing hole and with an annular raised ridge surrounding each of said bearing holes on the outer faces of each clevis arm, composed of a cylindrical body having a cavity to receive the outer curved portion of one arm of a U-shaped clevis and enclose said curved portion on three sides, an axially disposed tapped bore joining the top of said cavity, a curved lip at the bottom of said cavity to engage under the edge of the outer curved portion of said clevis arm, a pressure screw having a flat lower end threaded into said tapped bore, said body having a laterally disposed flat surface to bed a holding plate and radially extending threaded bore to receive a cap screw, a holding plate having a longitudinal centrally disposed slot and a lower end conforming to the annular raised ridge on said clevis arm outer faces to retain the puller body in position on the clevis, and a cap screw having a head engaging the sides of said slot in said holding plate and a shank portion extending through said slot and threaded into the radial hole in said puller body, and a washer ring under the head of said cap screw and bearing on the plate on each side of said slot.

3. The device as described in claim 2 wherein the lower end of the pressure screw is provided with an axial bore in combination with a pressure plate having a disk at its lower end adapted to conform to the upper edge of a bearing to be removed and a centrally disposed stem extending upward from said disk and fitting loosely into the bore at the lower end of said pressure screw.

References Cited in the file of this patent

UNITED STATES PATENTS

| | | |
|---|---|---|
| 1,807,329 | West et al. | May 26, 1931 |
| 2,377,973 | Scott | June 12, 1945 |